United States Patent
Clegg

(10) Patent No.: US 10,342,017 B2
(45) Date of Patent: *Jul. 2, 2019

(54) IEEE 802.11 COMMUNICATION UTILIZING CARRIER SPECIFIC INTERFERENCE MITIGATION

(71) Applicant: NETGEAR, Inc., San Jose, CA (US)

(72) Inventor: Michael Clegg, Campbell, CA (US)

(73) Assignee: NETGEAR, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/020,675

(22) Filed: Jun. 27, 2018

(65) Prior Publication Data

US 2018/0316478 A1 Nov. 1, 2018

Related U.S. Application Data

(63) Continuation of application No. 15/443,667, filed on Feb. 27, 2017, now Pat. No. 10,027,459, which is a
(Continued)

(51) Int. Cl.
*H04W 72/04* (2009.01)
*H04W 72/08* (2009.01)
(Continued)

(52) U.S. Cl.
CPC ...... *H04W 72/0453* (2013.01); *H04B 17/345* (2015.01); *H04J 11/0023* (2013.01);
(Continued)

(58) Field of Classification Search
CPC ... H04B 17/0027; H04B 17/003; H04L 43/08; H04W 24/00; H04W 72/04;
(Continued)

(56) References Cited

U.S. PATENT DOCUMENTS 9,055,592 B2 6/2015 Clegg
9,433,007 B2 8/2016 Clegg
(Continued)

OTHER PUBLICATIONS

International Search Report and Written Opinion issued for PCT/US2014/010540, dated May 6, 2014, 8 pages.

*Primary Examiner* — Chi H Pham
*Assistant Examiner* — Weibin Huang
(74) *Attorney, Agent, or Firm* — Norton Rose Fulbright US LLP

(57) ABSTRACT

Wireless communication under IEEE 802.11 standards utilizing carrier specific interference mitigation where an AP or UE employs an ultra-wideband tuner to evaluate available spectrum between several communication bands. Rather than being constrained to communicate in a single communication band, the AP and UEs may utilize more than one communication band to communicate with one another. In doing so, the AP and UE search across several bands and measure interference on a carrier-by-carrier basis across those bands. Either of the AP and UE may select a cluster of carriers for communication, where the cluster of carriers may comprise 1) contiguous carriers in a single sub-channel, 2) contiguous carriers spanning across more than one sub-channel, 3) discontinuous carriers in a single sub-channel, or 4) discontinuous carriers spanning across more than one sub-channel. The mapping between a cluster and its carriers can be fixed or reconfigurable.

16 Claims, 4 Drawing Sheets

Related U.S. Application Data continuation of application No. 15/226,659, filed on Aug. 2, 2016, now Pat. No. 9,693,352, which is a continuation of application No. 14/699,146, filed on Apr. 29, 2015, now Pat. No. 9,433,007, which is a continuation of application No. 13/735,941, filed on Jan. 7, 2013, now Pat. No. 9,055,592.

(51) Int. Cl.

| | | |
|---|---|---|
| *H04J 11/00* | (2006.01) | |
| *H04L 5/00* | (2006.01) | |
| *H04W 16/32* | (2009.01) | |
| *H04W 40/22* | (2009.01) | |
| *H04B 17/345* | (2015.01) | |
| *H04W 24/08* | (2009.01) | |
| *H04W 74/02* | (2009.01) | |
| *H04W 84/12* | (2009.01) | |
| *H04W 76/28* | (2018.01) | |
| *H04W 88/12* | (2009.01) | |

(52) U.S. Cl.
CPC .......... *H04L 5/0055* (2013.01); *H04L 5/0073* (2013.01); *H04W 16/32* (2013.01); *H04W 24/08* (2013.01); *H04W 40/22* (2013.01); *H04W 72/082* (2013.01); *H04W 74/02* (2013.01); *H04W 76/28* (2018.02); *H04W 84/12* (2013.01); *H04W 88/12* (2013.01)

(58) Field of Classification Search
CPC ............. H04W 72/0426; H04W 72/08; H04W 72/082; H04W 88/08; H04W 84/12; H04W 16/14; H04W 28/04; H04W 28/044; H04W 28/048
See application file for complete search history.

(56) References Cited

U.S. PATENT DOCUMENTS

| | | | |
|---|---|---|---|
| 9,693,352 B2 | 6/2017 | Clegg | |
| 10,027,459 B2* | 7/2018 | Clegg | ................ H04W 72/082 |
| 2001/0028692 A1* | 10/2001 | Wiese | ................... H04B 1/123 |
| | | | 375/346 |
| 2007/0206631 A1 | 9/2007 | Parts et al. | |
| 2011/0151908 A1* | 6/2011 | Hirabe | ................ H04B 7/0854 |
| | | | 455/501 |
| 2012/0113906 A1* | 5/2012 | Kadous | ................ H04W 16/14 |
| | | | 370/329 |
| 2012/0164948 A1* | 6/2012 | Narasimha | ........ H04W 72/1215 |
| | | | 455/63.1 |
| 2012/0195270 A1 | 8/2012 | Kang et al. | |
| 2012/0327869 A1 | 12/2012 | Wang et al. | |
| 2013/0337821 A1 | 12/2013 | Clegg | |
| 2014/0036816 A1 | 2/2014 | Madan et al. | |

\* cited by examiner

IEEE 802.11 COMMUNICATION UTILIZING CARRIER SPECIFIC INTERFERENCE MITIGATION

CROSS-REFERENCE TO RELATED APPLICATION

The present application is a continuation of U.S. patent application Ser. No. 15/443,667 filed Feb. 27, 2017, entitled "IEEE 802.11 COMMUNICATION UTILIZING CARRIER SPECIFIC INTERFERENCE MITIGATION"; which is a continuation of U.S. patent application Ser. No. 15/226,659 filed Aug. 2, 2016, issued Jun. 27, 2017, as U.S. Pat. No. 9,693,352, entitled "IEEE 802.11 COMMUNICATION UTILIZING CARRIER SPECIFIC INTERFERENCE MITIGATION"; which is a continuation of U.S. patent application Ser. No. 14/699,146 filed Apr. 29, 2015, issued Aug. 30, 2016, as U.S. Pat. No. 9,433,007, and entitled "IEEE 802.11 COMMUNICATION UTILIZING CARRIER SPECIFIC INTERFERENCE MITIGATION"; which is a continuation of U.S. patent application Ser. No. 13/735,941 filed Jan. 7, 2013, issued Jun. 9, 2015, as U.S. Pat. No. 9,055,592, entitled "IEEE 802.11 COMMUNICATION UTILIZING CARRIER SPECIFIC INTERFERENCE MITIGATION", the disclosures of which are hereby incorporated herein by reference in their entirety.

BACKGROUND OF THE DISCLOSURE

Wireless communication utilizing bands operated under the IEEE 802.11 standards has become increasingly popular. The IEEE 802.11 standards typically utilize the 2.4 GHz and/or the 5 GHz bands. Because these communication bands are of limited bandwidth, the increase in use often results in particularly high interference levels. To alleviate problems associated with high interference, some standards provide for utilizing more bandwidth. For example, the IEEE 802.11ac standard (which currently utilizes the 5 GHz band) is expected to provide a throughput on the order of 1 gigabit per second by utilizing channels of wider bandwidth, i.e., a bandwidth of up to 160 MHz, which itself may be divided into, e.g., eight (8) 20 MHz sub-channels, four (4) 40 MHz sub-channels, or two (2) 80 MHz sub-channels. Future standards are expected to increase channel bandwidth even more. For example, a proposed future IEEE 802.11ac standard utilizes both the 2.4 GHz and 5 GHz bands. Also, the proposed IEEE 802.11ad standard additionally utilizes the 60 GHz band.

Devices operating under the IEEE 802.11 standards may increase data throughput by aggregating one or more of the available sub-channels for simultaneous use in transmitting and receiving data. However, even in the most discrete case, the devices are able to utilize two or more adjacent or contiguous 20 MHz sub-channels for communication, but are constrained to utilize subcarriers only within the available sub-channels. To fully utilize available spectrum, an IEEE 802.11 device should be able to utilize carriers across multiple sub channels, even across disjointed bands (e.g., 2.4 GHz, 5 GHz, and or 60 GHz bands), without regard to whether those carriers are within an otherwise unavailable sub-channel.

SUMMARY OF THE DISCLOSURE

According to an aspect of the present disclosure, an IEEE 802.11 device is implemented within a network to utilize available carriers for communication over more than one communication band. Doing so takes advantage of a wider range of available spectrum and, as a result, increases network efficiency and overall data throughput. A method for wireless communication in a multi-band, multi-carrier wireless network, includes searching across more than one communication band to determine interference levels in each of the communication bands. The method also includes, based on the determination of interference levels in each of the communication bands, identifying candidate carriers in each of the bands for communication. The method further includes mitigating interference on a carrier-by-carrier basis for at least some of the identified candidate carriers in each of the communication bands. Finally the method includes transmitting wireless data on the carriers in each of the communication bands utilizing mitigation interference.

In another aspect of the present disclosure, an apparatus configured for IEEE 802.11 wireless communication includes at least one processor and a memory coupled to the at least one processor. The processor is configured to search across more than one communication band to determine interference levels in each of the communication bands. The processor is further configured to, based on the determination of interference levels in each of the communication bands, identify a set of candidate carriers in each of the bands for communication. The processor is further configured to mitigate interference on a carrier-by-carrier basis for at least some of the identified candidate carriers in each of the more than one communication bands. Finally, the processor is further configured to transmit wireless data on the carriers in each of the communication bands utilizing mitigation interference.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the propose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION OF THE DISCLOSURE

Figure 1:
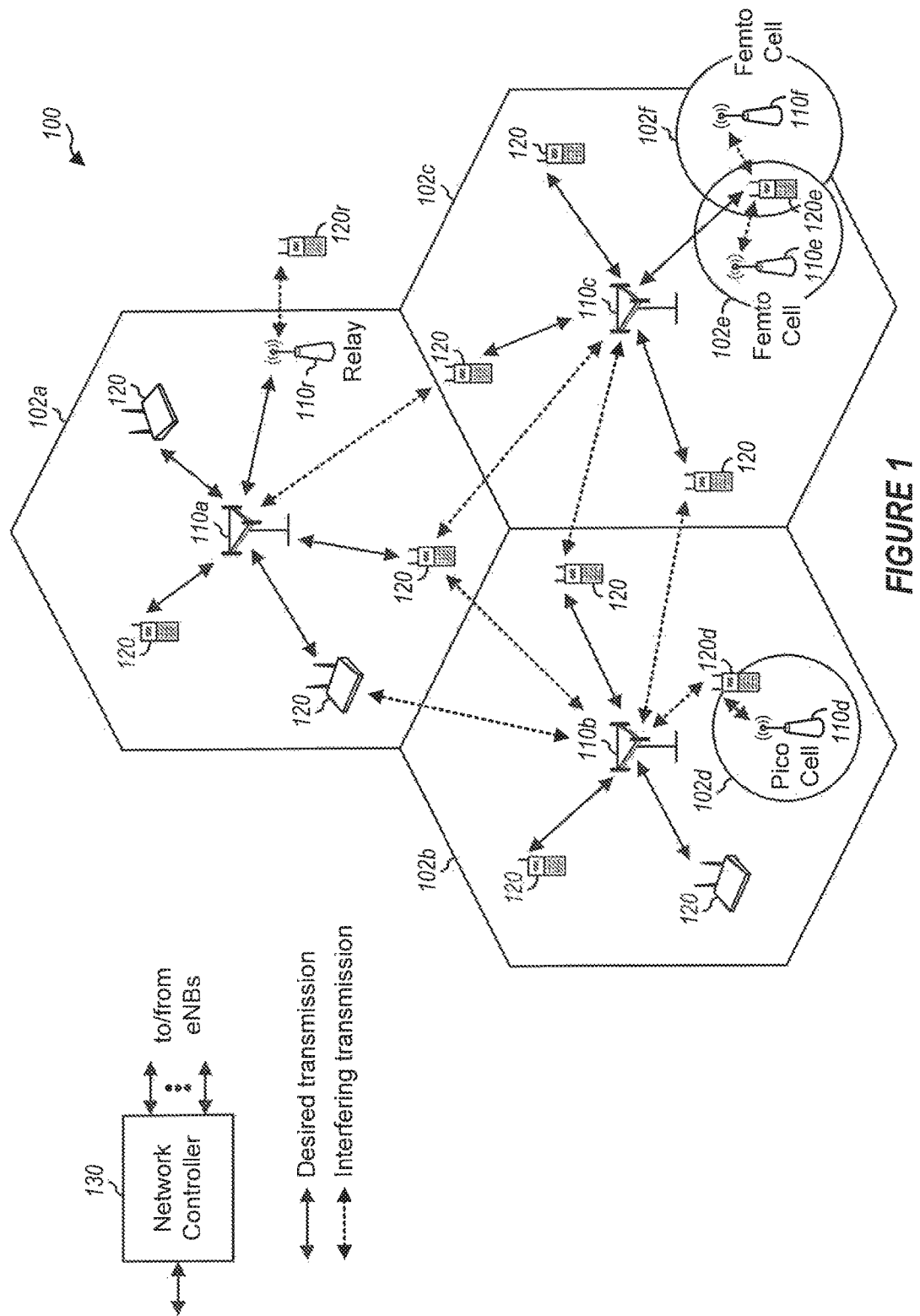
FIG. 1 is a block diagram illustrating an example of a communications system according to certain aspects of the present disclosure.

Systems and methods described herein obviate the limitation of communicating under IEEE 802.11 standards (i.e., WiFi wireless communication) by utilizing only carriers within particular sub-channels or a contiguous combination of sub-channels, WiFi is a popular technology that allows an electronic device to exchange data wirelessly (using radio waves) over a computer network, including high-speed Internet connections. The WiFi Alliance defines WiFi as any "wireless local area network (WLAN) products that are based on the Institute of Electrical and Electronics Engineers' (IEEE) 802.11 standards. According to concepts described herein, under, for example, the current IEEE 802.11ac standard, a device may utilize a relatively wide channel, i.e., 160 MHz, for data transmission and reception and/or several non-contiguous sub-channels therein. That is, the channel may be divided into several sub-channels, e.g., eight (8) 20 MHz sub-channels, four (4) 40 MHz sub-channels, or two (2) 80 MHz sub-channels. Current 802.11 devices may be assigned or otherwise determine that several sub-channels are available for communication. The devices may then aggregate or bond one or more available or assigned sub-channels to increase data rates. However, the devices are able to utilize carriers only within the assigned or available sub-channels, but are not able to utilize carriers from other sub-channels, e.g., unassigned sub-channels or sub-channels that have been determined to be low performing, low priority, or otherwise undesirable.

In a known 802.11 system, within the FORM physical (PHY) layer, the channel bandwidth is 20 MHz The 802.11n standard further provides support for an optional 40 MHz channel and the 802.11ac standard provides support for an 80 MHz channel as well as an optional 160 MHz channel. A known 802.11ac device must support 20, 40, and 80 MHz channel bandwidth reception and transmission, where an 80 MHz channel will consist of two adjacent, non-overlapping 40 MHz sub-channels, and a 160 MHz channel will consist of two adjacent, non-overlapping 80 MHz sub-channels.

As such, channels according to, e.g., the 802.11ac or 802.11n standards are treated with a spectrum channel block allocation so that each channel is incremented in multiple 20 MHz-wide sub-channels. According to known systems, standards require that only contiguous 20 MHz bands be combined to create, e.g., 40 MHz-wide or 80 MHz-wide sub-channels (according to the 802.11n & 802.11ac standards) or a 160 MHz-wide channel under the 802.11ac standard. According to those standards, OFDM subcarriers are spaced from one another at 312.5 kHz. Accordingly, in a known 802.11ac system, 20 MHz-wide contiguous channels, e.g., sub-channels 1-4, are combined to form a single 80 MHz wide channel. However, this is problematic in the case of interference across one or more sub-channels. For example, the WiFi, band centered about the 5 cGHz band shares channels with Radar, and if Radar interference is detected, a user is required to suspend WiFi communication in the sub-channel occupied by Radar interference. In this example where Radar interference occupied sub-channel 3, using, e.g., dynamic frequency selection (DFS), a user would be limited to using only sub-channels 1 and 2.

According to concepts described herein, following the previous example, a user would be able to utilize sub-channels 1, 2, and 4, and in some cases, subcarriers within sub-channel 3, where such subcarriers are not occupied by the interfering Radar signal. According to an embodiment, this is accomplished by "notching out" specific OFDM subcarriers at, e.g., 312.5 kHz subcarrier increments. Extended further, the entire band, including sub-channels 1, 2, 3, and 4 may be examined to create a channel map—where only individual interfering 312.5 kHz subcarriers are notched out to create the map. Extended even further, considering the previous example, the user could examine multiple WiFi bands across, e.g., the 2.4 GHz communication band and the 5 GHz communication band and treat the intermediate, interfering subcarriers as the "knocked out" subcarriers.

According to additional concepts described herein, an IEEE 802.11 device may utilize carriers across the entire available spectrum, even in otherwise low priority or undesirable sub-channels. In doing so, an IEEE 802.11 device utilizes an ultra-wideband tuner to evaluate the entire available spectrum between several communication bands (e.g., the 2.4 GHz and 5 GHz bands), and then take advantage of the OFDM protocol to cancel interference on a carrier-by-carrier or cluster-by-cluster basis.

One or more Access Points ("APs") communicate with one another and/or with one or more User Equipment ("UEs"). The APs and UEs may communicate in a multi-communication band, multi-carrier wireless network. Rather than being constrained to communicate in a single communication band, the APs and UEs may utilize more than one communication band to communicate with one another. In doing so, the AP and UE search across 1) available bands (e.g., the 2.4 GHz, 5 GHZ, and/or 60 GHz bands), and 2) sub-channels within each band, and measure interference on a carrier-by-carrier basis across those bands and sub-channels. Either of the AP and UE may select a cluster of carriers for communication, where the cluster of carriers may comprise: 1) contiguous carriers in a single sub-channel, 2) contiguous carriers spanning across more than one sub-channel, 3) discontinuous carriers in a single sub-channel, or 4) discontinuous carriers spanning across more than one sub-channel. The sub-channels that support a cluster may be within a single communication channel or contained in more than one communication channels. A cluster comprising consecutive or contiguous carriers may be referred to as a coherence cluster, while a cluster comprising disjoint or discontinuous carriers may be referred to as a diversity cluster. The mapping between a cluster and its carriers can be fixed or reconfigurable. The APs and/or UEs perform interference mitigation on a carrier-by-carrier basis to allow optimized communications, even utilizing multiple bands.

FIG. 1 illustrates a wireless communication network 100, which may be a wireless local area network (WLAN). Preferred embodiments of the present disclosure are directed to devices communicating under the IEEE 802.11 standards, and are meant to relieve network burden from particularly high traffic density in those environments. Wireless network 100 includes a number of wireless network APs 110 and other network entities. An AP may be a station that communicates with other APs and/or UEs and may also be referred to as a node and the like. Each AP 110 may provide communication coverage for a particular "hot spot," typically having a range of about 20 meters (65 feet) indoors and a greater range outdoors. In the example shown in FIG. 1, the APs 110a, 110b, and 110c serve hotspots 102a, 102b and 102c, respectively. The AP 110d serves hotspot 102d, the APs 110e and 110f serve hotspots 102e and 102f, respectively.

Within network 100, each AP may further communicate with one or more eNodeBs. An eNodeB may provide communication coverage for a macro cell, a pico cell, a femtocell, a small cell, and/or other types of cell. An eNodeB may support one or multiple (e.g., two, three, four, and the like) cells. A macro cell generally covers a relatively large geographic area (e.g., several kilometers in radius) and may allow unrestricted access by UEs with service subscriptions with the network provider. A pico cell generally covers a relatively smaller geographic area and may allow unrestricted access by UEs with service subscriptions with the network provider. A femtocell generally covers a relatively small geographic area in a residential-type setting (e.g., a home or small business) and, in addition to unrestricted access, may also provide restricted access by UEs having an association with the femtocell (e.g., UEs in a closed UE group (CSG). UEs for users in the home, and the like). A small cell covers a relatively small geographic area in an urban-type setting (e.g., a shopping mall, enterprise area, etc.) and may provide unrestricted access and restricted access by UEs having an association with the small cell. Finally, an eNodeB for a macro cell may be referred to as a macro eNodeB, an eNodeB for a pico cell may be referred to as a pico eNodeB, an eNodeB for a femtocell may be referred to as a femto eNodeB or a home eNodeB, and an eNodeB for a small cell may be referred to as a small cell eNodeB.

A network controller 130 may couple to a set of APs 110 and provide coordination and control for these APs 110. The network controller 130 may communicate with the APs 110 via a backhaul or via one or more of the eNodeBs described above.

UEs 120 are dispersed throughout the wireless network 100, and each UE may be stationary or mobile. A UE may also be referred to as a terminal, a mobile station, a UE unit, a station, or the like. A UE may be a cellular phone, a personal digital assistant (FDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, small cell eNodeBs, relays, and the like. In FIG. 1, a solid line with double arrows indicates desired transmissions between a UE and a serving AP, which is an AP designated to serve the UE on the downlink and/or uplink. A dashed line with double arrows indicates interfering transmissions between a UE and an AP.

Figure 2:
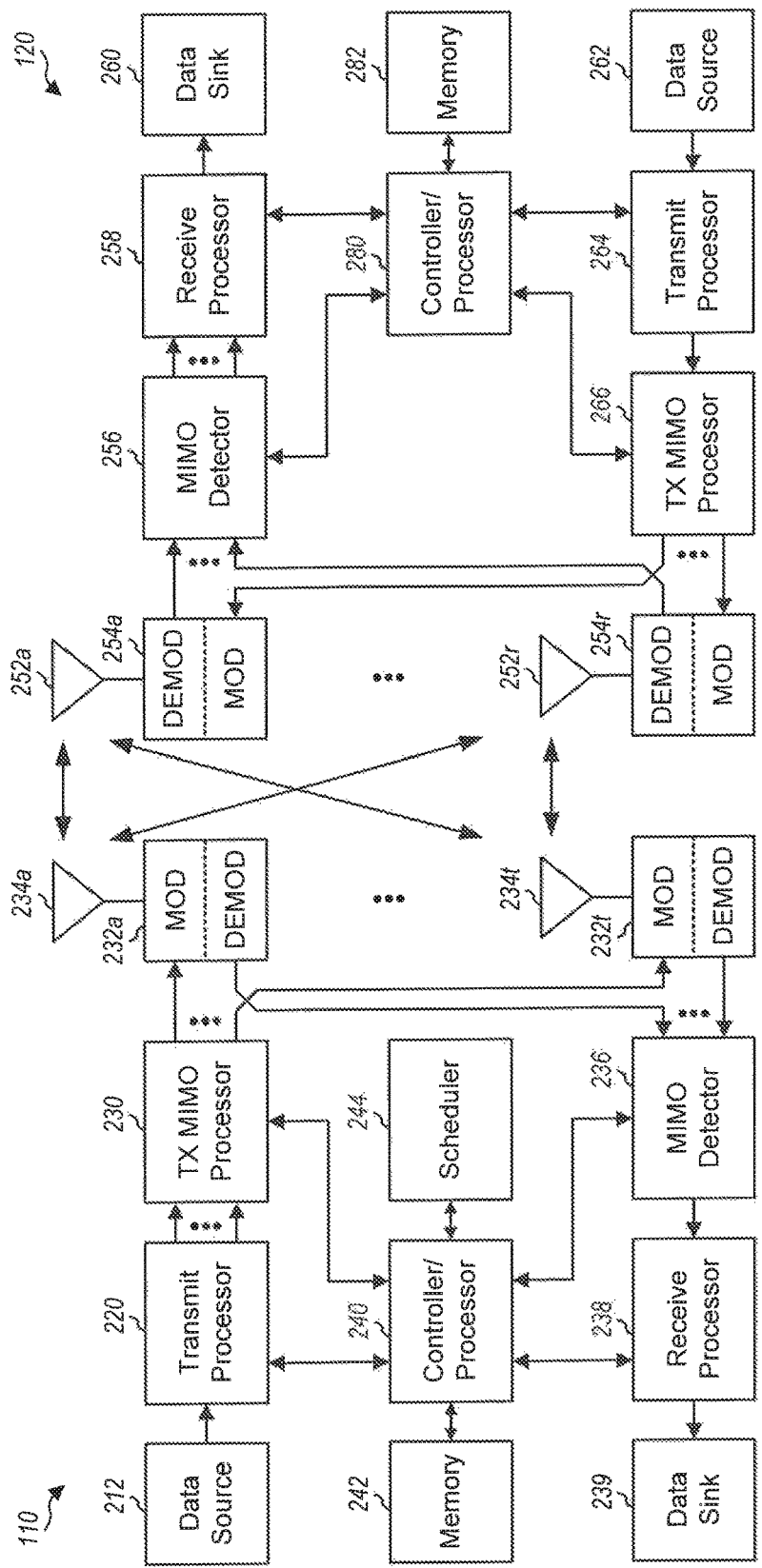
FIG. 2 is a block diagram illustrating a design of an AP and a UE configured according to one aspect of the present disclosure.

FIG. 2 is a block diagram of a design of a AP 110 and a UE 120, which may be one of the APs and one of the UEs in FIG. 1. The AP 110 may be equipped with antennas 234a through 234t, and the UE 120 may be equipped with antennas 252a through 252r.

At AP 110, a transmit processor 220 may receive data from a data source 212 and control information from a controller/processor 240. The processor 220 may process (e.g., encode and symbol map) the data and control information to obtain data symbols and control symbols, respectively. The processor 220 may also generate reference symbols and hotspot-specific reference signals. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 120, the antennas 252a through 252r may receive the downlink signals from the AP 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data from a data source 262 and control information from the controller/processor 280. The processor 264 may also generate reference symbols for a reference signal. The symbols from the transmit processor 264 may be preceded by a TX MIMO processor 266 if applicable, further processed by the modulators 254a through 254r, and transmitted to the AP 110. At AP 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the AP 110 and the UE 120, respectively. The processor 240 and/or other processors and modules at the AP 110 may perform or direct the execution of various processes for the techniques described herein. The processor 280 and/or other processors and modules at the UE 120 may also perform or direct the execution of the functional blocks relating to APs and/or other processes for the techniques described herein. The memories 242 and 282 may store data and program codes for the AP 110 and the UE 120, respectively. A scheduler 244 may schedule UEs for data transmission on the downlink and/or uplink.

An AP, such as AP 110e, communicates with a UE, such as UE 120e, over more than one communication band utilizing IEEE 802.11 standards. Transmit processor 220 and receive processor 238 are designed in a manner so that they process signals over various communication bands. In doing so, the AP and UE provide additional network capacity while avoiding undue burden on a particular communication band. The AP may further utilize frequency bands for both the uplink (UL) and downlink (DL), e.g., shared by UL and DL according to FDD or TDD communication schemes. According to one aspect, controller/processor 240 of AP 110e is programmed in a manner such that the frequency band that will be used to modulate signals transmitted by antennas 234 can be selected automatically or manually by a system operator.

Generally, as employed herein, unless otherwise noted, a communication band (sometime referred to as a "frequency band") is a generally contiguous portion of the electromagnetic spectrum which is regulated by a governmental entity, such as the Federal Communications Commission (FCC) for the United States, generally under a single designation. According to an aspect of the present disclosure, an AP and UE communicate with one another under the IEEE 802.11 standards utilizing one or more communication bands. Examples of bands used by the AP and UE include hands such as those centered upon or about 2.4 GHz, 5 GHz, and 60 GHz. As such, the AP and UE may communicate as IEEE 802.11ac devices, 802.11n devices, 802.11ad devices, and the like.

For example, according to certain aspects, under the IEEE 802.11ac standard, an AP and UE utilize one or more 160 MHz channels within a band, where the channels may be divided into several sub-channels, e.g., eight (8) 20 MHz sub-channels, four (4) 40 MHz sub-channels, or two (2) 80 MHz sub-channels. The devices may then aggregate one or more available assigned sub-channels to increase data rates further, the devices are able to utilize carriers across the entire band, e.g., carriers from unassigned sub-channels or sub-channels that have been determined to be low performing, low priority, or otherwise undesirable.

Decisions to initiate, maintain, and/or alternate communication on certain carriers or clusters of carriers can be made at both the AP and the UE. These decisions may be based upon different metrics or qualities (such as CQI, SNR, etc) of respective carriers or clusters of carriers measured at either of the AP and/or UE. Further, each AP and UE may develop a priority of preferred carriers or clusters of carriers. In this way, APs may communicate with one or more UEs on utilizing more than one band or multiple sub-channels across more than one band in an optimal way.

Each AP and UE may perform one or a combination of steps to avoid or mitigate interference from devices communicating on to-be-selected or previously-selected carriers or a cluster of carriers. Interference mitigation may be performed by the AP and/or the UE on a carrier-by-carrier basis or a cluster-by-cluster basis across more than one band. It should be appreciate that interference mitigation on a carrier-by-carrier basis or a cluster-by-cluster basis may be accomplished utilizing different techniques. According to one embodiment, subcarriers spaced from one another at, e.g., 312.5 KHz, are examined to identify interference levels on each subcarrier. This is performed on each subcarrier, irrespective of which particular sub-channel or communication band (e.g., the 2.4 GHz or 5 GHz band) the subcarrier belongs. Where interference is determined (by way of measurement or evaluation) to be too high or above a threshold amount, the subcarriers suffering an unduly high amount of interference may be "notched out" on a carrier-by-carrier basis. Further, a channel map may create for carriers across sub-channels and across communication bands so that a user can select subcarriers from across those bands to form a cluster for communication. As such, the user is not constrained to a single sub-channel or contiguous sub-channels.

Preferably, techniques utilized herein proactively reject and mitigate interference on specific carriers. If performance throughput degrades due to interference or other environmental conditions, an AP and/or UE may determine an optimum antenna combination to, e.g., avoid problematic carriers. One available technique involves selecting carriers across multiple sub-channels, where those carriers are determined to be under-utilized utilizing using the Carrier Sense Multiple Access (CSMA) protocol. In this way, the overall quality of a given sub-channel may be treated as a secondary consideration, where a primary consideration is to avoid Wi-Fi collisions. That is, a trade off may be made on a carrier-by-carrier basis to avoid collisions even where the carriers selected for use are within an otherwise undesirable or less preferred sub-channel.

Further, the AP and/or UE may perform a "monitor" function on one or more of the available carriers to determine which, if any, are more suitable. The monitor function may comprise monitoring one or more carriers or clusters of carriers, across multiple bands, to determine what devices are utilizing those carriers, whether any communication is periodic or aperiodic, and the strength of interference on those carriers. Further, the monitor function may be performed aperiodically, periodically (e.g., according to a pre-set interval or according to operator or system preferences), or continuously (where, e.g., the increased power requirements are justified by the extra bandwidth features). Further, the AP and/or UE may detect interference on one or more carriers, determine whether the detected interference is periodic or aperiodic, and then schedule communications on optimal carriers to avoid the interference. On the other hand, the AP and/or LIE may increase transmit power if interference on carriers cannot effectively be avoided. Additionally, the AP and/or UE select specific carriers that may be scheduled for communication during other device transmission gaps, similar to a TDD scheme, to allow other devices to operate one the carriers.

Each AP or UE may continuously monitor the reception of pilot symbols and measure the SINR and/or other parameters, including inter-hotspot interference and intra-hotspot interference, of each cluster. Based on that information, each AP or UE selects one or more clusters with good performance (e.g., high SINR and low traffic loading) relative to each other and feeds back the information on these candidate clusters to the eNodeB through predefined uplink access channels. For example, SINR values higher than 10 dB may indicate good performance. Likewise, a cluster utilization factor less than 50% may be indicative of good performance. Each AP or UE selects the clusters with relatively better performance than others. The selection results in each AP or UE selecting clusters they would prefer to use based on the measured parameters.

In one embodiment, each UE measures the SINR of each carrier cluster and reports these SINR measurements to an AP through an access channel. The SINR value may comprise the average of the SINR values of each of the carriers in the cluster. Alternatively, the SINR value for the cluster may be the worst SINR among the SINR values of the carriers in the cluster. In still another embodiment, a weighted averaging of SINR values of the carriers in the cluster is used to generate an SINR value for the cluster. This may be particularly useful in diversity clusters where the weighting applied to the carriers may be different.

The feedback of information from each UE to the AP contains a SINR value for each cluster and also indicates the coding/modulation rate that the UE desires to use. No cluster index is needed to indicate which SINR value in the feedback corresponds to which cluster as long as the order of information in the feedback is known to the AP. In an alternative embodiment, the information in the feedback is ordered according to which clusters have the best performance relative to each other for the UE. In such a case, an index is needed to indicate to which cluster the accompanying SINR value corresponds.

Upon receiving the feedback from a UE, the AP further selects one or more clusters for the UE among the candidates. The AP may utilize additional information available at the AP, e.g., the traffic load information on each carrier, amount of traffic requests queued at the AP for each frequency band, whether frequency bands are overused, and how long a UE has been waiting to send information. The carrier loading information of neighboring cells can also be exchanged between APs. The APs can use this information in carrier allocation to reduce inter-cell interference.

After cluster selection, the AP notifies the UE about the cluster allocation through a downlink common control channel or through a dedicated downlink traffic channel if the connection to the UE has already been established. In one embodiment, the AP also informs the UE about the appropriate modulation/coding rates.

Once the basic communication link is established, each UE can continue to send the feedback to the AP using a dedicated traffic channel (e.g., one or more predefined uplink access Channels). However, the traffic channel may include a diversity cluster, which itself may include disjoint carriers across one or more communication bands.

In one embodiment, the AP allocates all the clusters to be used by a UE at once. In an alternative embodiment, the AP first allocates multiple clusters, referred to herein as the basic clusters, to establish a data link between the AP and the UE. The AP then subsequently allocates more clusters, referred to herein as the auxiliary clusters, to the UE to increase the communication bandwidth. Higher priorities can be given to the assignment of basic clusters and lower priorities may be given to that of auxiliary clusters. For example, the AP first ensures the assignment of the basic clusters to the UEs and then tries to satisfy further requests on the auxiliary clusters from the UEs. Alternatively, the AP may assign auxiliary clusters to one or more UEs before allocating basic clusters to other UEs. For example, a AP may allocate basic and auxiliary clusters to one UE before allocating any clusters to other UEs. In one embodiment, the AP allocates basic clusters to a new UE and then determines if there are any other UEs requesting clusters. If not, then the AP allocates the auxiliary clusters to that new UE.

Further, on downlink channels, each UE may measure the channel and interference information for all the carriers and then select multiple carriers with good performance (e.g., a high signal-to-interference plus noise ratio (SINR)) and feedback the information on these candidate carriers to the AP. The feedback may comprise channel and interference information (e.g., signal-to-interference-plus-noise-ratio information) on all carriers or just a portion of carriers. In case of providing information on only a portion of the carriers, a UE may provide a list of carriers ordered starting with those carriers which the UE desires to use, usually because their performance is good or better than that of other carriers. Upon receiving the information from the UE, the AP further selects the carriers among the candidates, utilizing additional information available at the AP, e.g., the traffic load information on each carrier, amount of traffic requests queued at the AP for each frequency band, whether frequency bands are overused, and/or how long a UE has been waiting to send information. In one embodiment, the carrier loading information of neighboring cells can also be exchanged between APs. The APs can use this information in carrier allocation to reduce inter-cell interference.

According to other aspects, the decision making and allocation procedures previously described as performed by one or more APs may be additionally or alternatively performed by one or more UEs. According to yet other aspects, a separate device such as a controller may be utilized to coordinate communication between the AP and UE and other devices operating on the same bands. The controller may be implemented at, e.g., the AP or the core network, and may obtain device and channel information from the AP, UE, external network devices operating on various communication bands, and the like. In this way, the AP is connected to the controller, which allocates and manages the spectrum utilization across multiple communication bands.

A rank or priority of carriers or clusters of carriers may be compiled such that the AP and/or UE optimize their communications when deciding to utilize specific carriers or clusters of carriers. Further, such steps may be repeated so that the carriers or clusters of carriers are re-prioritized over time to further inform the AP, UE, or controller of an optimal carriers or clusters of carriers for communication at subsequent times.

According to concepts described herein, interference can be cancelled on a carrier-by-carrier basis by utilizing a number of mechanisms, including adaptive nulling and deterministic nulling. In utilizing adaptive nulling, a receiver at an AP or UE identified the interference components within the received signals, and the signals from the antennas (or the cross products from pairs of antennas) are combined in a way that causes the interference vectors to cancel one another. In utilizing deterministic nulling, the direction of the interfering transmission source is identified and a null signal or vector is formed in that direction. Nulls can be formed by adjusting the weights with which the cross-products of the outputs of pairs of antennas are combined. In this way, the nulls are formed in the synthesized beam.

With the previous discussion in mind, an exemplary system according to the present discussion involves an IEEE 802.11 AP and a UE each utilizing ultra wideband tuners for tuning to carriers across one or more communication bands. As employed herein, ultra-wideband tuner is one that is capable of tuning on the order of 1 GHz of frequency. Consider that the AP and UE are communicating according to a standard, such as, e.g., the 802.11n or 802.11ac standard. In that situation, the AP and UE may center their tuners upon a given center frequency, such as, e.g., the 2.4 GHz or 5 GHz band. Further, each communication channel may be divided into multiple sub-channels, e.g., four (4) 40 MHz sub-channels or eight (8) 20 MHz sub-channels. By exploiting the OFDM protocol and ultra wideband tuners, the AP and UE may scan over one or both of the 2.4 GHz band and the 5 GHz band to identify available or even desirable sub-channels. Further, however, the devices may select from all sub-channels to identify what carriers or groups of carriers are optimal. Once identified, a cluster of carriers can be utilized for communication, even where the cluster comprise carriers from sub-channels in both the 2.4 GHz band and the 5 GHz band.

Accordingly, consider that a device utilizes a channel in a first communication band (e.g., the communication band center about 2.4 GHz), which is divided into eight sub-channels (i.e., sub-channels 1, 2, 3, 4, 5, 6, 7, and 8) and a channel in a second communication band (e.g., the communication band center about 5 GHz), which is divided into eight sub-channels (i.e., sub-channels 9, 10, 11, 12, 13, 14, 15, 16, 17, and 18). Whereas it may have previously been determined that one or more sub-channels are unavailable, e.g., where a sub-channel is determined to generally subject to low SINR, high traffic, etc. Previous implementations would have excluded the undesirable sub-channel in its entirety. However, according to the concepts described herein, adequately performing carriers within the generally undesirable sub-channel can be identified and utilized by the AP and UE to form a cluster for communication there between.

Figure 3:
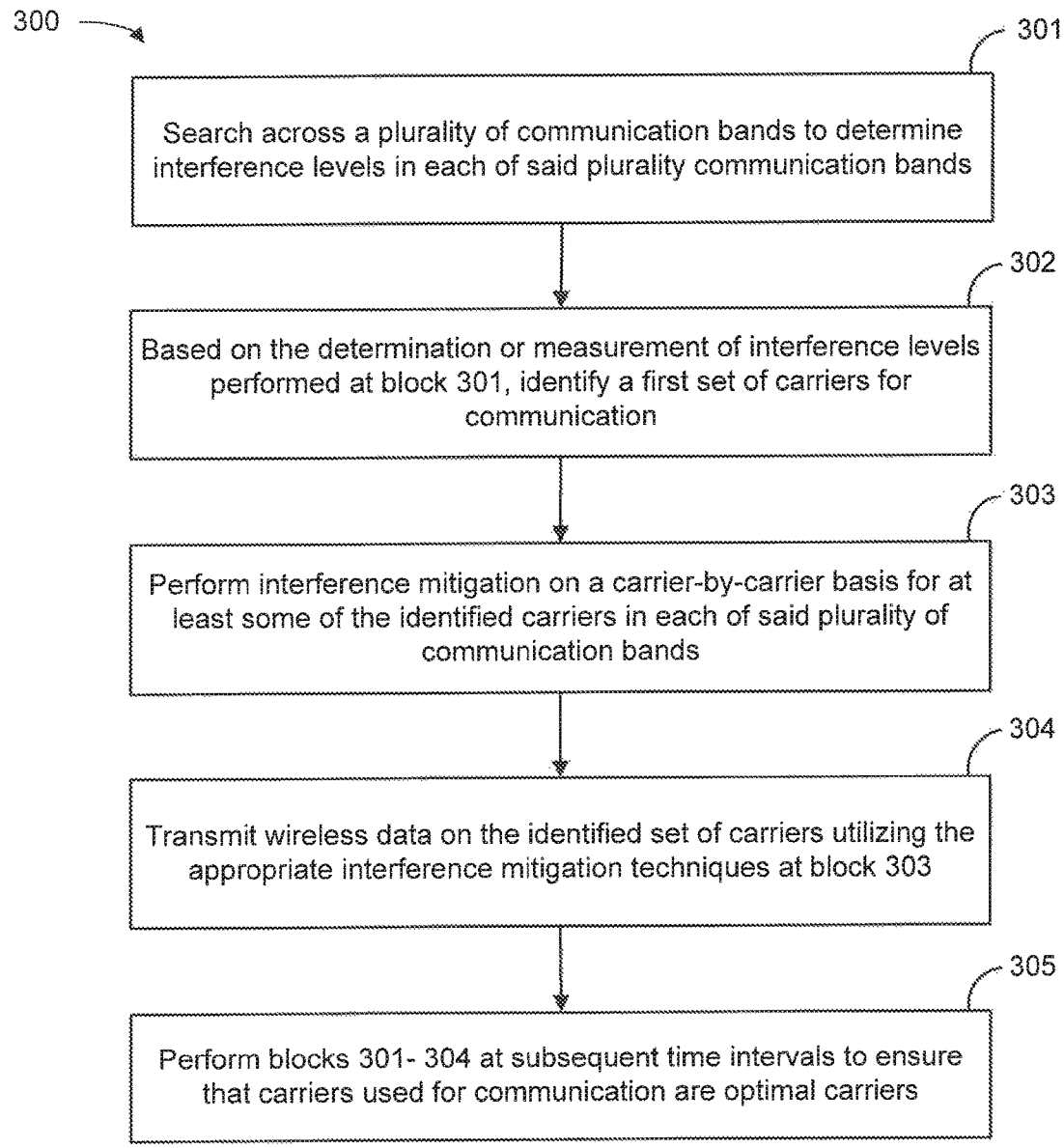
FIG. 3 is a functional block diagram illustrating example blocks executed to implement an aspect of the present disclosure.

FIG. 3 is a functional block diagram 300 illustrating example blocks executed to implement aspects of the present disclosure. At block 301, an AP such as AP 110 or a UE such as UE 120 shown in FIG. 1, operating within a cellular network searches across a plurality of communication bands to determine interference levels in each of said plurality communication bands. The AP or UE is able to do so by utilizing an ultra-wideband tuner, which allows the AP or UE to search across the order of 1 GHz of frequency. The AP or UE measures interference on a carrier-by-carriers basis or a cluster-by-cluster basis. In doing so, the AP or UE may additionally measure interference levels for various sub-channels within a given communication band. The communication bands of interest may be disjointed, i.e., where one band of interest is separated from another band of interest by a substantial bandwidth. In any event, particular communication bands of interest may include the band centered about 2.4 GHz and 5 GHz.

At block 302, based on the determination or measurement of interference levels performed at block 301, a first set of carriers are identified for communication. These carriers may be thought of as candidate carriers, which are expect to qualify as those carriers most likely to provide optimized communications between an AP and UE. The first set of carriers may be thought of as a cluster of carriers, and may comprise: 1) contiguous carriers in a single sub-channel, 2) contiguous carriers spanning across more than one sub-channel, 3) discontinuous carriers in a single sub-channel, or 4) discontinuous carriers spanning across more than one sub-channel. Further, given stub-channels within each sub-channel may be identified as sub-channels having a higher or lower number of candidate carriers. As part of this process, the AP or UE may rank or prioritize the carriers, clusters, or sub-channels according to their respective measured interference levels. By way of example, sub-channels having a relatively high number of candidate carriers may quality as a higher priority sub-channel while those having a relatively low number of candidate carriers may quality as a lower priority sub-channel. The rank or priority may be transmitted to another communication apparatus, such as an AP or UE, or a controller, which may further communicate same to the other communicating apparatus.

An AP or UE may transmit an indication of the identified carriers to an apparatus with which it is communicating. That is, where the AP or UE identified candidate carriers or a set of carriers it prefers for communication, that information may be shared with the other apparatus. This serves to inform the other apparatus that it should take steps necessary to 1) confirm those candidate carriers as acceptable for communication, and 2), if so, prepare to communication using the candidate carriers. Doing so may involve tuning to the appropriate carriers, performing steps to route other inter-cell and intra-cell traffic away from those carriers, and set appropriate modulation and timing schemes to avoid undue interference The other communication apparatus may additionally transmit an acknowledgment to the AP or UE that it agrees the candidate carriers are acceptable. Further, the other communication apparatus may take additional steps to refine the candidate carriers by, e.g., communicating a new ranking or priority or simply removing carriers its finds to be unacceptable.

At block 303, the AP or UE performs interference mitigation on a carrier-by-carrier basis for at least some of said identified carriers in each of said plurality of communication bands. The interference mitigation may be performed in a number of ways including, e.g., the adaptive and deterministic nulling techniques described herein. In this way, carriers within otherwise low priority or otherwise unqualified sub-channels may still be utilized for communications. That is, carriers within such otherwise low priority or otherwise unqualified sub-channels may utilized to form a set of carriers for which communications will occur.

At block 304, the AP or UE transmits wireless data on the identified set of carriers. The AP or UE does so utilizing the appropriate interference mitigation techniques described above at block 303.

At block 305, blocks 301-304 are performed at subsequent time intervals as a mechanism to ensure that carriers used for communication are optimal carriers. That is, a second search may be performed across the communication bands to determine interference levels on carriers at subsequent times. Based on the measure interference levels at subsequent times, an updated set of candidate carriers may be created. As such, interference mitigation may be performed on the new set of candidate carriers and the communicating devices will tune to the new carriers for continued communication.

Figure 4:
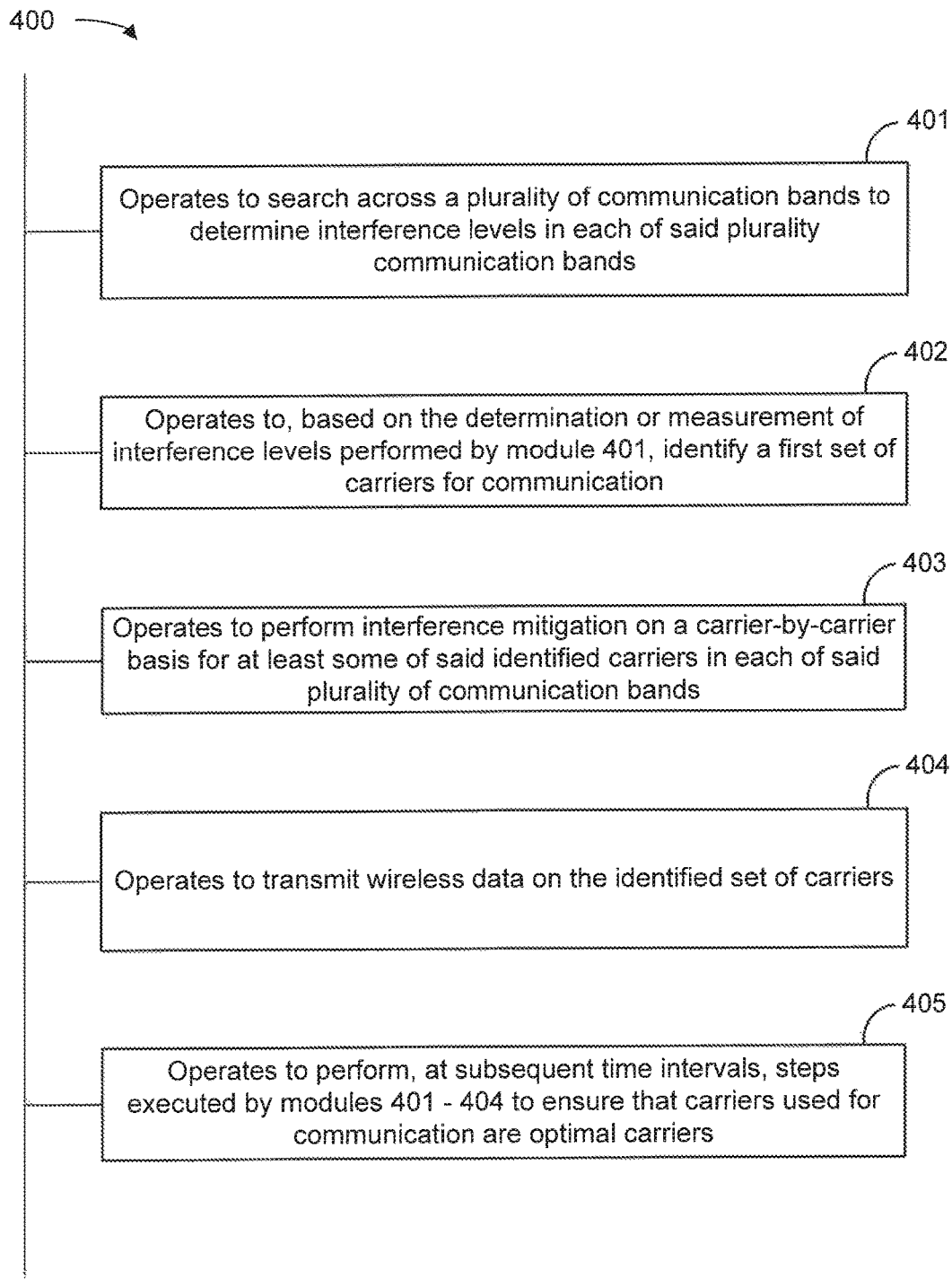
FIG. 4 is a block diagram representation of a wireless communication apparatus configured according to an aspect of the present disclosure.

FIG. 4 is a block diagram illustrating apparatus 400 for wireless communication. Apparatus 400 may include one or more components or portions of small cell AP 110 or UE 120. Apparatus 400 also includes modules 401, 402, 403, 404, and 405, which are executed to provide operations as described herein. Each of modules 401, 402, 403, 404, and 405 may comprise software, program code, or other logic (e.g., ASIC, FPGA, etc.), as may be operable upon or executed by processor 401 to provide the functions described below.

Module 401 operates under control of a processor of apparatus 400 to search across a plurality of communication bands to determine interference levels in each of said plurality communication bands. Apparatus 400 is able to do so by utilizing an ultra-wideband tuner, which allows it to search across the order of 1 GHz of frequency. Apparatus measures interference on a carrier-by-carriers basis or a cluster-by-cluster basis. In doing so, apparatus 400 may additionally measure interference levels for various sub-channels within a given communication band. The communication bands of interest may be disjointed, i.e., where one band of interest is separated from another band of interest by a substantial bandwidth. In any event, particular communication bands of interest may include the band centered about 2.4 GHz and 5 GHz.

Module 402 operates under control of a processor of apparatus 400 to, based on the determination or measurement of interference levels performed by module 401, identify a first set of carriers for communication. These carriers may be thought of as candidate carriers, which are expect to qualify as those carriers most likely to provide optimized communications between apparatus 400 and another communicating apparatus, e.g., an AP 110 or UE 120. The first set of carriers may be thought of as a cluster of carriers, and may comprise: 1) contiguous carriers in a single communication band, 2) contiguous carriers spanning across more than one communication band, 3) discontinuous carriers in a single communication band, or 4) discontinuous carriers spanning across more than one communication band. Further, given sub-channels within each communication band may be identified as sub-channels having a higher or lower number of candidate carriers. As part of this process, apparatus 400 may rank or prioritize the carriers, clusters, or sub-channels according to their respective measured interference levels. By way of example, sub-channels having a relatively high number of candidate carriers may quality as a higher priority sub-channel while those having a relatively low number of candidate carriers may quality as a lower priority sub-channel. The rank or priority may be transmitted to another communication apparatus, such as an AP 110 or UE 120, or a controller, which may further communicate same to the other communicating apparatus.

Apparatus 400 may transmit an indication of the identified carriers to an apparatus with which it is communicating. That is, where apparatus 400 identifies candidate carriers or a set of carriers it prefers for communication, that information may be shared with the other apparatus. This serves to inform the other communicating apparatus that it should take steps necessary to 1) confirm those candidate carriers as acceptable for communication, and 2), if so, prepare to communication using the candidate carriers. Doing so may involve tuning to the appropriate carriers, performing steps to route other inter-cell and intra-cell traffic away from those carriers, and set appropriate modulation and timing schemes to avoid undue interference. The other communication apparatus may additionally transmit an acknowledgment to apparatus 400 that it agrees the candidate carriers are acceptable. Further, the other communication apparatus may take additional steps to refine the candidate carriers by, e.g., communicating a new ranking or priority or simply removing carriers its finds to be unacceptable.

Module 403 operates under control of a processor of apparatus 400 to perform interference mitigation on a carrier-by-carrier basis for at least some of said identified carriers in each of said plurality of communication bands. The interference mitigation may be performed in a number of ways including, e.g., the adaptive and deterministic nulling techniques described herein, in this way, carriers within otherwise low priority or otherwise unqualified sub-channels may still be utilized for communications. That is, carriers within such otherwise low priority or otherwise unqualified sub-channels may utilized to form a set of carriers for which communications will occur.

Module 404 operates under control of a processor of apparatus 400 to transmit wireless data on the identified set of carriers. Apparatus 400 does so utilizing the appropriate interference mitigation techniques performed by module 403.

Module 405 operates under control of a processor of apparatus 400 to perform, at subsequent time intervals, subsequent steps to ensure that carriers used for communication are optimal carriers. That is, a second search may be performed across the communication bands to determine interference levels on carriers at subsequent times. Based on the measured interference levels at subsequent times, an updated set of candidate carriers may be created. As such, interference mitigation may be performed on the new set of candidate carriers and the communicating devices will tune to the new carriers for continued communication.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication in a multi-band, multi-carrier wireless network, the method comprising:
measuring, at a User Equipment (UE), interference levels in one or more of a plurality of Institute of Electrical and Electronics Engineers (IEEE) 802.11 communication bands;
transmitting, to an Access Point (AP), an indication of interference levels in the one or more of the plurality of IEEE 802.11 communication bands; and
receiving, at the UE, wireless data on first carriers in the one or more of the plurality of IEEE 802.11 communication bands identified by the AP based on the indication of interference levels, where interference has been mitigated on a carrier-by-carrier basis for one or more of the identified first carriers in the one or more of the plurality of IEEE 802.11 communication bands.

2. The method of claim 1 where the mitigating interference comprises:
identifying interference components in the identified first carriers; and
combining the interference components in a way that causes the interference components to cancel one another.

3. The method of claim 1 further comprising:
transmitting an indication of the identified first carriers to an eNodeB; and
in response to the transmitting, receiving an acknowledgment of the identified first carriers from the eNodeB.

4. The method of claim 1 further comprising:
measuring, at the UE, second interference levels in the one or more of a plurality of IEEE 802.11 communication bands;
transmitting, to an Access Point (AP), an indication of the second interference levels in the one or more of the plurality of IEEE 802.11 communication bands; and
receiving, from the AP, wireless data on second carriers in the one or more of the plurality of IEEE 802.11 communication bands, where based on the indication of the second interference levels in the one or more of the plurality of IEEE 802.11 communication bands, the AP
identifies the second carriers in the one or more of the plurality of IEEE 802.11 communication bands for communication,
mitigates interference on a carrier-by-carrier basis for one or more of the identified second carriers in the one or more of the plurality of the IEEE 802.11 communication bands, and
transmits the wireless data on the one or more of the identified second carriers in the one or more of the plurality of IEEE 802.11 communication bands for which interference is mitigated.

5. An apparatus configured for wireless communication in a multi-band, multi-carrier wireless network, the apparatus comprising:
a non-transitory memory; and
one or more processors coupled to the non-transitory memory, where the one or more processors are configured to:
measure, at a User Equipment (UE), interference levels in one or more of a plurality of Institute of Electrical and Electronics Engineers (IEEE) 802.11 communication bands;
transmit, to an Access Point (AP), an indication of interference levels in the one or more of the plurality of IEEE 802.11 communication bands; and
receive, at the UE, wireless data on first carriers in the one or more of the plurality of IEEE 802.11 communication bands identified by the AP based on the indication of interference levels, where interference has been mitigated on a carrier-by-carrier basis for one or more of the identified first carriers in the one or more of the plurality of IEEE 802.11 communication bands.

6. The apparatus of claim 5 where the one or more processors are further configured to:
identify interference components in the identified first carriers; and
combine the interference components in a way that causes the interference components to cancel one another.

7. The apparatus of claim 5 where the one or more processors are further configured to:
transmit an indication of the identified first carriers to an eNodeB; and
in response to the transmitting, receive an acknowledgment of the identified first carriers from the eNodeB.

8. The apparatus of claim 5 where the one or more processors are further configured to:
measure, at the UE, second interference levels in the one or more of a plurality of IEEE 802.11 communication bands;
transmit, to an Access Point (AP), an indication of the second interference levels in the one or more of the plurality of IEEE 802.11 communication bands; and
receive, from the AP, wireless data on second carriers in the one or more of the plurality of IEEE 802.11 communication bands, where based on the indication of the second interference levels in the one or more of the plurality of IEEE 802.11 communication bands, the AP
identifies the second carriers in the one or more of the plurality of IEEE 802.11 communication bands for communication,
mitigates interference on a carrier-by-carrier basis for one or more of the identified second carriers in the one or more of the plurality of IEEE 802.11 communication bands, and
transmits the wireless data on the one or more of the identified second carriers in the one or more of the plurality of IEEE 802.11 communication bands for which interference is mitigated.

9. A method for wireless communication in a multi-band, multi-carrier wireless network, the method comprising:
measuring, at a User Equipment (UE), interference levels in one or more of a plurality of Institute of Electrical and Electronics Engineers (IEEE) 802.11 communication bands;
transmitting, to an Access Point (AP), an indication of interference levels in the one or more of the plurality of IEEE 802.11 communication bands;
receiving, from the AP, an indication of identified first carriers for communication between the UE and AP, where the identification is based on the indication of interference levels in the one or more of the plurality of IEEE 802.11 communication bands; and receiving, from the AP, data on the identified first carriers, where interference is mitigated on a carrier-by-carrier basis for one or more of the identified first carriers in the one or more of the plurality of IEEE 802.11 communication bands.

10. The method of claim 9 where the mitigating interference comprises:
   identifying interference components in the identified first carriers; and
   combining the interference components in a way that causes the interference components to cancel one another.

11. The method of claim 9 further comprising:
   transmitting an indication of the identified first carriers to an eNodeB; and
   in response to the transmitting, receiving an acknowledgment of the identified first carriers from the eNodeB.

12. The method of claim 9 further comprising:
   measuring, at the UE, second interference levels in the one or more of a plurality of IEEE 802.11 communication bands;
   transmitting, to an Access Point (AP), an indication of the second interference levels in the one or more of the plurality of IEEE 802.11 communication bands; and
   receiving, from the AP, an indication of identified second carriers for communication between the UE and AP, where based on the indication of the second interference levels in the one or more of the plurality of IEEE 802.11 communication bands, the AP identifies the second carriers for communication between the UE and AP;
   transmitting, to the AP, an acknowledgment of the second carriers identified for communication between the UE and AP; and
   receiving, from the AP, data on the identified second carriers, where interference is mitigated on a carrier-by-carrier basis for one or more of the second identified carriers in the one or more of the plurality of IEEE 802.11 communication bands.

13. An apparatus configured for wireless communication in a multi-band, multi-carrier wireless network, the apparatus comprising:
   a non-transitory memory; and
   one or more processors coupled to the non-transitory memory, where the one or more processors are configured to:
      measure, at a User Equipment (UE), interference levels in one or more of a plurality of Institute of Electrical and Electronics Engineers (IEEE) 802.11 communication bands;
      transmit, to an Access Point (AP), an indication of interference levels in the one or more of the plurality of IEEE 802.11 communication bands;
      receive, from the AP, an indication of identified first carriers for communication between the UE and AP, where the identification is based on the indication of interference levels in the one or more of the plurality of IEEE 802.11 communication bands; and
      receive, from the AP, data on the identified first carriers, where interference is mitigated on a carrier-by-carrier basis for one or more of the first identified carriers in the one or more of the plurality of IEEE 802.11 communication bands.

14. The apparatus of claim 13 where the one or more processors are further configured to:
   identify interference components in the identified first carriers; and
   combine the interference components in a way that causes the interference components to cancel one another.

15. The apparatus of claim 13 where the one or more processors are further configured to:
   transmit an indication of the identified first carriers to an eNodeB; and
   in response to the transmitting, receive an acknowledgment of the identified first carriers from the eNodeB.

16. The apparatus of claim 13 where the one or more processors are further configured to:
   measure, at the UE, second interference levels in the one or more of a plurality of IEEE 802.11 communication bands;
   transmit, to an Access Point (AP), an indication of the second interference levels in the one or more of the plurality of IEEE 802.11 communication bands; and
   receive, from the AP, an indication of identified second carriers for communication between the UE and AP, where based on the indication of the second interference levels in the one or more of the plurality of IEEE 802.11 communication bands, the AP identifies the second carriers for communication between the UE and AP;
   transmit, to the AP, an acknowledgment of the second carriers identified for communication between the UE and AP; and
   receive, from the AP, data on the identified second carriers, where interference is mitigated on a carrier-by-carrier basis for one or more of the second identified carriers in the one or more of the plurality of IEEE 802.11 communication bands.

* * * * *

UNITED STATES PATENT AND TRADEMARK OFFICE
CERTIFICATE OF CORRECTION

Page 1 of 1

PATENT NO. : 10,342,017 B2
APPLICATION NO. : 16/020675
DATED : July 2, 2019
INVENTOR(S) : Michael Clegg It is certified that error appears in the above-identified patent and that said Letters Patent is hereby corrected as shown below:

In the Specification

At Column 1, Line number 58, delete "sub channels" and replace with --sub-channels--.
At Column 2, Line number 10, delete "hands for communication" and replace with --bands for communication--.
At Column 2, Line number 52, delete "propose" and replace with --purpose--.
At Column 3, Line number 15, delete "sub-channels, WiFi" and replace with --sub-channels. WiFi--.
At Column 3, Line number 63, delete "the WiFi, band centered" and replace with --the WiFi band centered--.
At Column 5, Line number 21, delete "(CSG). UEs" and replace with --(CSG), UEs--.
At Column 5, Line number 41, delete "personal digital assistant (FDA)" and replace with --personal digital assistant (PDA)--.
At Column 6, Line number 31, delete "preceded" and replace with --precoded--.
At Column 7, Line number 10, delete "hands" and replace with --bands--.
At Column 7, Line number 21, delete "data rates" and replace with --data rates.--.
At Column 8, Line number 23, delete "LIE" and replace with --UE--.
At Column 9, Line number 18, delete "Channels" and replace with --channels--.
At Column 10, Line number 36, delete "As employed herein, ultra-wideband tuner" and replace with --As employed herein, an ultra-wideband tuner--.
At Column 10, Line number 42, delete "hand" and replace with --band--.
At Column 11, Line number 33, delete "stub-channels" and replace with --sub-channels--.
At Column 13, Line number 34, delete "herein, in this way" and replace with --herein. In this way--.

In the Claims

At Column 15, Claim number 4, Line number 58, delete "of the plurality of the IEEE 802.11 communication bands" and replace with --of the plurality of IEEE 802.11 communication bands--.

Signed and Sealed this
Third Day of September, 2019

Andrei Iancu
*Director of the United States Patent and Trademark Office*